(12) United States Patent
Mathews et al.

(10) Patent No.: US 8,051,615 B2
(45) Date of Patent: Nov. 8, 2011

(54) CABLE ANCHOR

(75) Inventors: Thomas F. Mathews, Fort Worth, TX (US); Stan Landry, Euless, TX (US); Robert K. Van Noord, Dallas, TX (US)

(73) Assignee: Actuant Corporation, Butler, WI (US)

( * ) Notice: Subject to any disclaimer, the term of this patent is extended or adjusted under 35 U.S.C. 154(b) by 621 days.

(21) Appl. No.: 12/120,503

(22) Filed: May 14, 2008

(65) Prior Publication Data

US 2008/0282640 A1 Nov. 20, 2008

Related U.S. Application Data

(60) Provisional application No. 60/938,366, filed on May 16, 2007.

(51) Int. Cl.
*E04C 5/12* (2006.01)
*F16C 11/02* (2006.01)

(52) U.S. Cl. .......... 52/223.13; 52/223.6; 52/223.7; 52/711; 403/78

(58) Field of Classification Search .......... 52/146, 52/148, 149, 152, 223.13, 223.6, 223.7, 711; 403/78
See application file for complete search history.

(56) References Cited

U.S. PATENT DOCUMENTS

| | | | | |
|---|---|---|---|---|
| 407,559 A * | 7/1889 | Wells | ............. | 403/44 |
| 1,616,325 A * | 2/1927 | Minster | ............. | 403/76 |
| 1,814,609 A * | 7/1931 | Smith | ............. | 403/78 |
| 1,829,964 A * | 11/1931 | Randall | ............. | 403/38 |
| 2,905,491 A * | 9/1959 | Olson | ............. | 403/44 |
| 3,049,775 A * | 8/1962 | Ondeck | ............. | 403/365 |
| 3,143,365 A * | 8/1964 | Egger | ............. | 403/77 |
| 3,163,904 A * | 1/1965 | Ziolkowski | ............. | 403/365 |
| 3,329,454 A * | 7/1967 | Melton et al. | ............. | 403/77 |
| 3,399,434 A * | 9/1968 | Kelly | ............. | 403/194 |
| 3,491,431 A * | 1/1970 | Pewitt | ............. | 29/452 |
| 3,798,856 A * | 3/1974 | Gloskowski | ............. | 52/127.2 |
| 3,833,706 A * | 9/1974 | Edwards | ............. | 264/228 |
| 3,858,846 A | 1/1975 | Schmid | | |
| 3,877,113 A * | 4/1975 | Reyes | ............. | 24/115 M |
| 3,910,546 A * | 10/1975 | Connors | ............. | 249/40 |
| 3,937,607 A * | 2/1976 | Rodormer | ............. | 425/111 |
| 3,965,543 A * | 6/1976 | Connors | ............. | 24/136 R |
| 4,019,420 A * | 4/1977 | Fischer | ............. | 411/49 |
| 4,023,803 A * | 5/1977 | Lewis | ............. | 463/47.5 |
| 4,065,996 A * | 1/1978 | Fischer | ............. | 411/18 |
| 4,498,563 A * | 2/1985 | Trahan | ............. | 188/65.1 |
| 4,501,080 A * | 2/1985 | Rich | ............. | 38/102.7 |
| 4,799,307 A * | 1/1989 | Reigstad et al. | ............. | 29/452 |
| 4,899,499 A | 2/1990 | Hoekstra | | |
| 5,042,888 A * | 8/1991 | Shinjo | ............. | 411/54 |
| 5,328,300 A * | 7/1994 | Fischer et al. | ............. | 405/259.6 |
| 5,596,845 A * | 1/1997 | Strizki | ............. | 52/98 |

\* cited by examiner

*Primary Examiner* — Phi Dieu A Tran

(74) *Attorney, Agent, or Firm* — Quarles & Brady LLP

(57) ABSTRACT

A cable anchor has ball surfaces that permit misalignment between the cable and a stem of the anchor, and a fitting that permits the introduction of a corrosion inhibitor to the interior of the anchor.

8 Claims, 3 Drawing Sheets

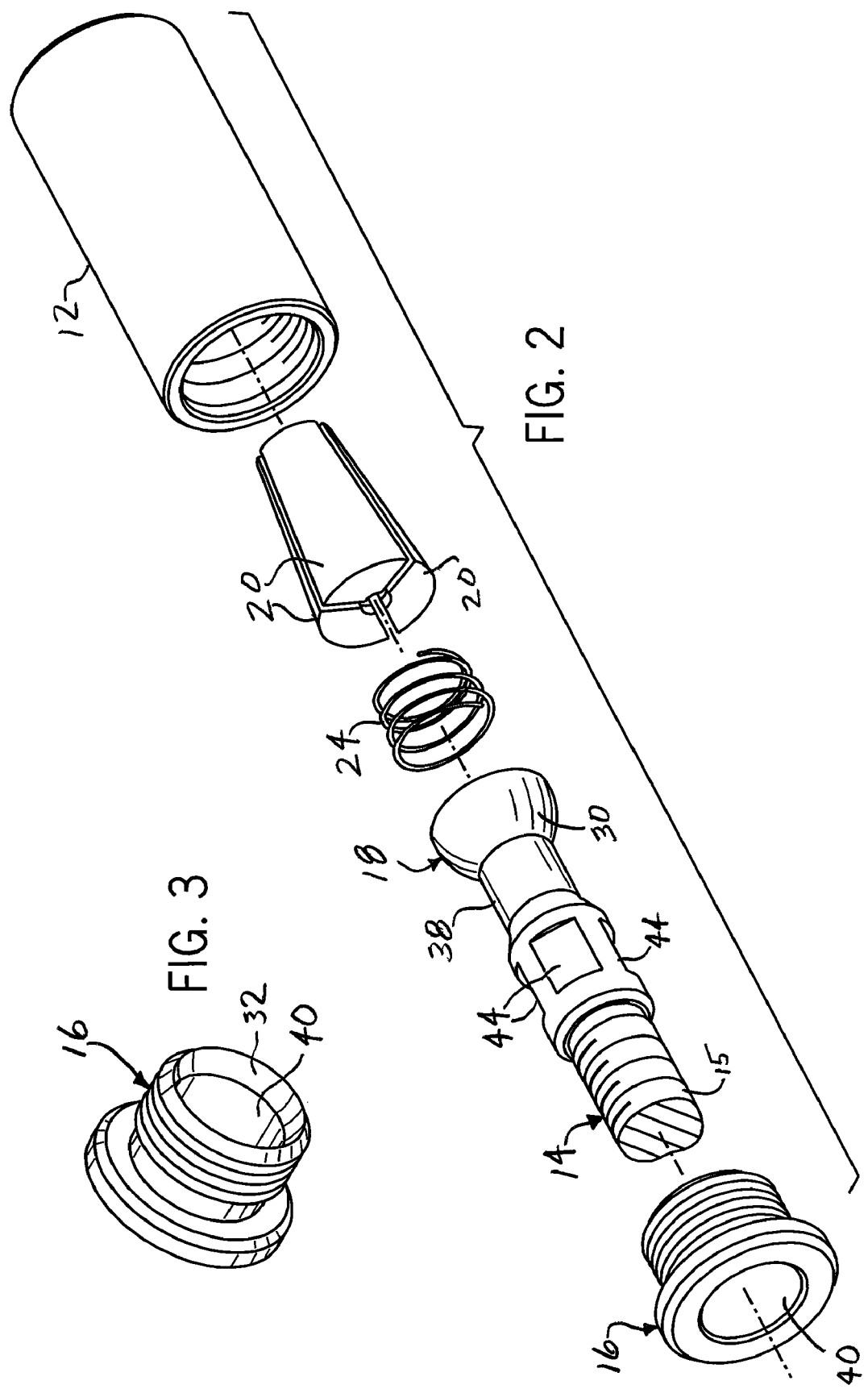

CABLE ANCHOR

CROSS-REFERENCE TO RELATED APPLICATION

This claims the benefit of U.S. Provisional Patent Application No. 60/938,366 filed May 16, 2007, which is hereby incorporated by reference.

STATEMENT CONCERNING FEDERALLY SPONSORED RESEARCH OR DEVELOPMENT

Not applicable.

FIELD OF THE INVENTION

This invention relates to an apparatus for anchoring the end of a cable to a structure such as a concrete pillar, post, or the like.

BACKGROUND OF THE INVENTION

This invention relates to cable anchors of the type disclosed in U.S. Pat. No. 4,899,499, the disclosure of which is hereby incorporated by reference. The anchor disclosed has a body with a wedge-shaped (conical) internal bore surface, cable grippers with wedge-shaped (conical) external surfaces received in the bore, a cable gripped by the grippers and extending from one end of the body, a cap at the opposite end attached to the body through which a stem extends outside of the body and the stem having a head that is captured against a facing surface of the cap. The stem is threaded into an insert that is embedded in a concrete structure. The facing surfaces of the cap and head are generally flat such that in this structure it is desirable that the axis of the stem and the axis of the cable be aligned. While that is ideal, that is not always the case in practice. In practice, there are often at least slight deviations between the axis of the cable and the axis of the stem, which stress the components of the connection. In addition, as the cables that are anchored oftentimes form barriers, even if the cable is initially aligned, at least generally, with the stem, an impact to the cable can result in significant stresses and deviations from aligned axes, which, even if temporary, can damage or even break the assembly. Corrosion inside the anchor, for example between the grippers and the body, the cable and the grippers and the cap and the stem, exacerbates the problem.

SUMMARY OF THE INVENTION

The invention provides an apparatus for anchoring the end of a cable to a structure with the head of the stem and the facing surface of the cap being shaped to allow articulation between the head of the stem and the cap while maintaining surface contact. Preferably, the mating surfaces of the head and cap are frusto-spherical in shape. Thereby, an anchor of the invention can accommodate misalignments between the axis of the cable and the axis of the stem, either upon initial construction, impact to the cable, or other changes that may occur during the life of the structure, such as vibrations and settling.

In another aspect of the invention, the portion of the stem that extends through the cap should have sufficient clearance with the cap to permit articulation of the stem relative to the cap.

In another aspect, the interior surfaces of an anchor are preferably lubricated or otherwise corrosion protected. In this aspect, the body can be provided with a fitting through which grease or another corrosion inhibitor can be introduced to the interior of the body to protect the wedges or grippers, housing and strand interface, which is the most vulnerable area for corrosion to start, and also to lubricate and protect the mating surfaces of the stem and cap.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 2 is an exploded perspective view of an anchor of the invention;

FIG. 3 is a perspective view of the cap of FIG. 2 viewed in the opposite direction of FIG. 2.

DETAILED DESCRIPTION OF THE PREFERRED EMBODIMENT

Figure 1:
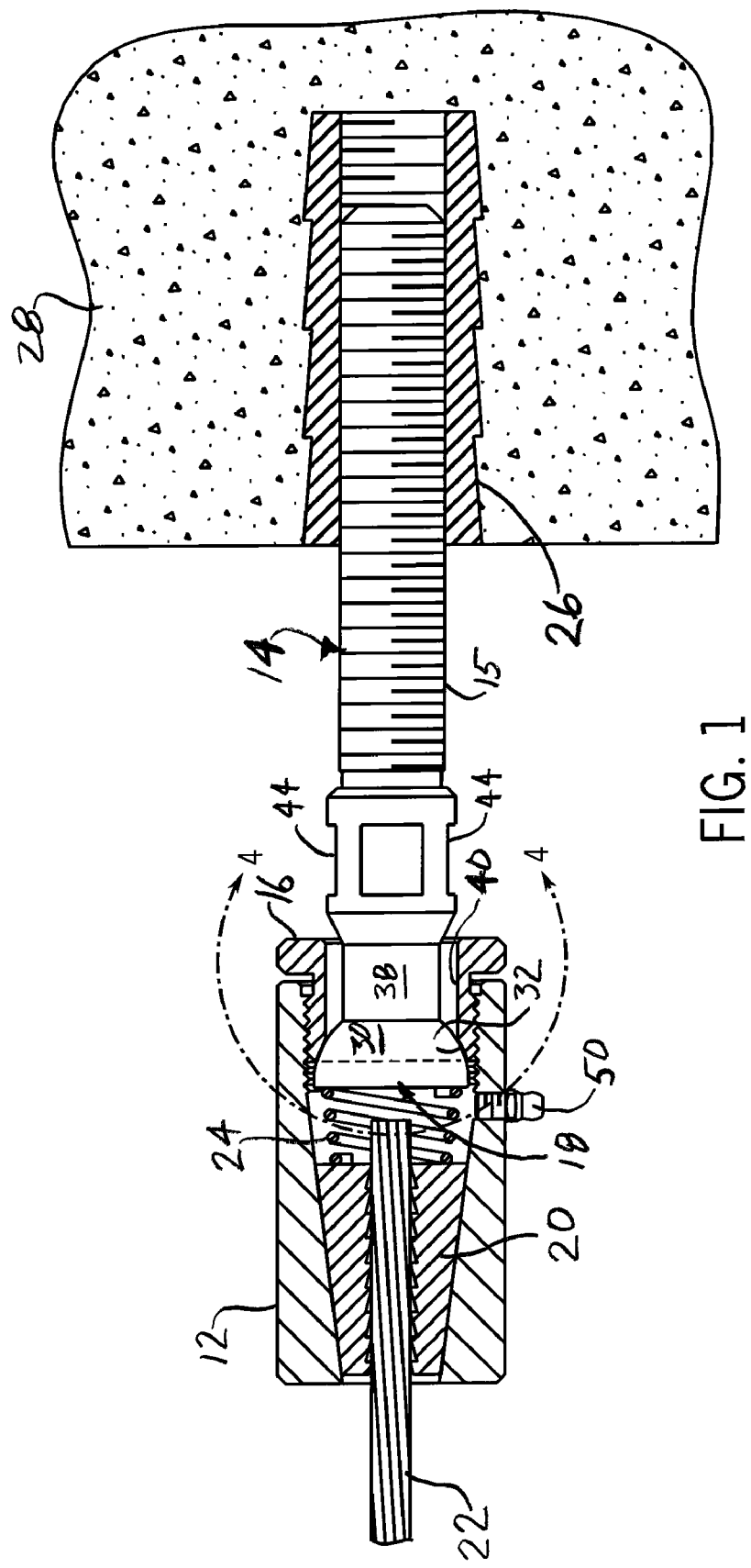
FIG. 1 is a cross-sectional view of an anchor of the invention installed in an insert embedded in a concrete structure and gripping the end of a cable.
Figure 4:
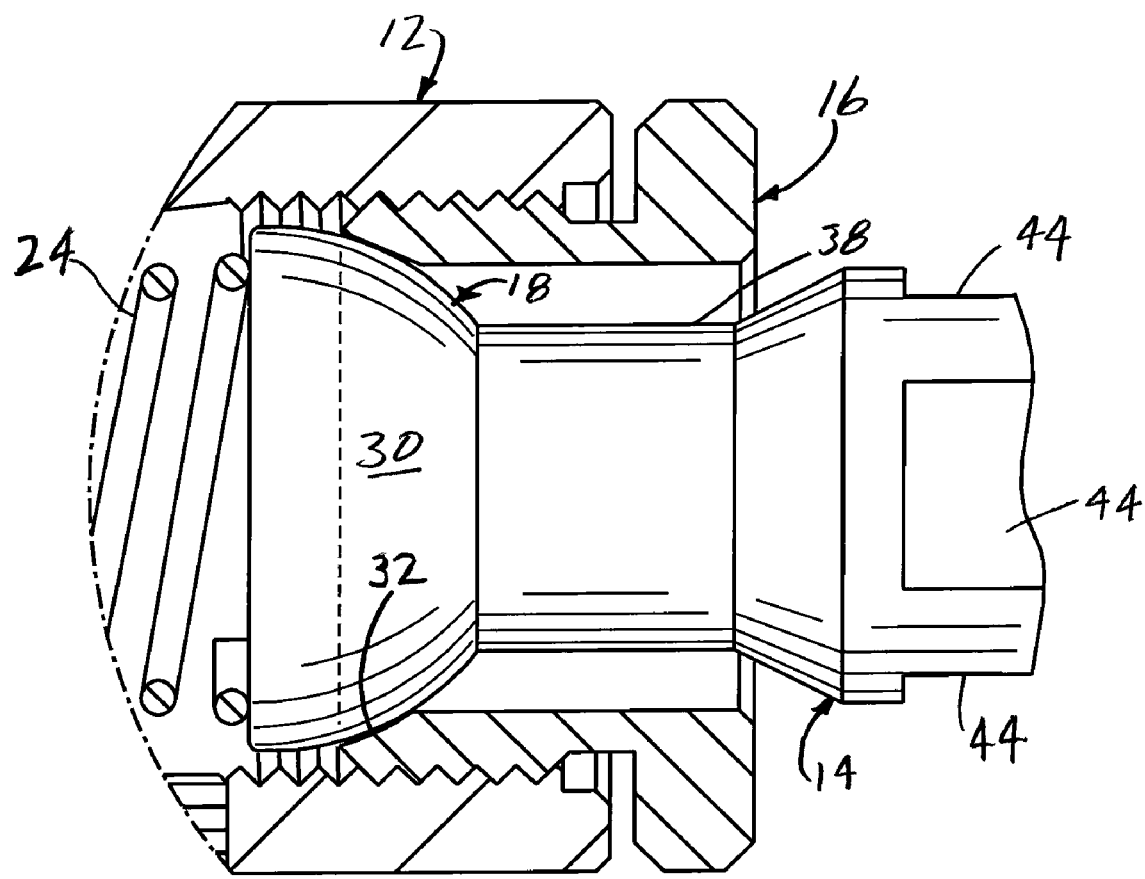
FIG. 4 is a detail cross-sectional view illustrating the mating surfaces between the stem and cap.

Referring to FIG. 1, an anchor 10 of the invention is illustrated including a chuck body 12, a stem 14, a cap 16 attached to the chuck body and capturing the head 18 of the stem, grippers 20 securing the end of a cable 22 in the bore of the chuck body, and a spring 24 in the bore of the chuck body urging the grippers 20 into engagement with the cable 22. Also illustrated in FIG. 1 is an insert 26 embedded in a concrete structure 28 into which a shank 15 of the stem 14 is threadedly fastened.

Referring to FIGS. 2 and 3, the head 18 of the stem 14 has a frusto-spherical surface 30 that mates with a frusto-spherical surface 32 of the cap 16. The mating frusto-spherical surfaces 30 and 32 permit articulation for 360° about the axis of the stem 14 relative to the cap 16. The range of articulation permitted from the aligned position illustrated is sufficient to accommodate typical impacts, vibrations and construction imperfections. Thereby, the anchor 10 can accommodate misalignments between the axis of the cable 22 and the axis of the stem 14 that may result from many different causes.

While it is preferred that frusto-spherical surfaces be formed on both of the head 18 and the cap 16, it may be possible to accomplish the advantages of the invention with other combinations of surfaces, for example, with just a frusto-spherical surface on the head 18 and a frusto-conical surface on the cap 16, or just line contact at the end of a circular bore of the cap 16.

The stem 14 also has a neck section 38 that extends through bore 40 of the cap 16 and is significantly smaller in diameter than the bore 40 so as to provide clearance to accommodate articulating motions of the stem 14 relative to the cap 16. This clearance is what determines the range of articulation permitted by the construction. In addition, preferably, where the stem 14 exits the cap 16 and is exposed, the stem 14 has flats 44 that can be engaged by a wrench to turn the stem 14 so as to threadedly engage the shank 15 with the insert 26. It is noted that the shank 15 as illustrated is externally threaded, but could alternatively be internally threaded.

The cable grippers 20 are conventional, for example, a set of two or three wedge-shaped jaws. Typically, the interior surface of the grippers 20 is formed with teeth, which may be formed by a thread cutting operation, and the exterior is a frusto-conical surface or a portion of a frusto-conical surface. The bore of the body 12 is a mating frusto-conical surface such that when the grippers 20 are urged leftwardly as viewed in FIG. 1, they clamp down on the end of the cable 22 and bite into it to firmly grip it. The spring 24 biases the grippers 20 in this direction to aid in initial gripping of the cable 22.

Preferably, the mating surfaces 30 and 32 are lubricated so as to reduce friction therebetween to take full advantage of the invention. Particularly when so lubricated, an anchor of the invention can accommodate and absorb even small misalignments between the cable 22 and the stem 14, such as may be caused by vibrations, to prevent vibrations from being transmitted either to or from the cable to the stem 14. Lubrication also reduces the stress on the assembly which may be caused by larger articulations, for example, from an impact, from the building settling, or during initial installation.

To assure adequate corrosion protection to protect the wedges 20, housing 12 and strand 22 interface, which is the most vulnerable area for corrosion to start, and also to lubricate and protect against corrosion of the mating surfaces of the head and cap, a grease zerc fitting 50 (FIG. 1) is preferably provided in the body 12, through which grease or another corrosion inhibitor may be introduced into the body 12. This also helps lubricate the surfaces 30 and 32 as discussed above.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

The invention claimed is:

1. In an apparatus for anchoring an end of a cable to a structure, the apparatus having a tubular body with an opening in one end into which the end of a cable may be inserted, a gripper for gripping the end of a cable within the tubular body, a threaded stem mounted to the other end of the body and extending from the body, the stem having an enlarged head that is captured against a facing surface at the other end of the body, the improvement wherein:

a frusto-spherical surface is formed on at least one of the head of the stem and the facing surface, the frusto-spherical surface permitting the stem to articulate relative to the tubular body so as to allow angular deflection of the stem relative to the body the cable gripper comprises a set of jaws;

a fitting in an opening through a side of the tubular body through which a corrosion inhibitor can be introduced into the tubular body.

2. The apparatus of claim 1, wherein the tubular body has a wedge-shaped bore section and wherein the gripper comprises a set of jaws that collectively have a generally wedge-shaped exterior surface adapted to be moved within and operatively wedged by the tubular body bore section into gripping engagement with a cable end positioned within the jaws.

3. The apparatus of claim 1, further comprising a flat surface secured to the stem whereby the stem may be fastened to an insert by wrench engagement of the flat surface.

4. The apparatus of claim 3, wherein the insert is set in concrete.

5. The apparatus of claim 1, wherein the facing surface is formed on an end cap mounted to the body, the end cap having a hole through which the stem extends and wherein the enlarged head is in rotatable sliding contact with the facing surface of the end cap.

6. The apparatus of claim 5, wherein the head of the stem is a convex surface and the facing surface is concave.

7. The apparatus of claim 6, wherein the cap is screwed into the body.

8. The apparatus of claim 1, further comprising a spring mounted within the body that biases the cable gripper toward a gripping position.

\* \* \* \* \*